United States Patent
Nishida et al.

[11] Patent Number: 6,134,900
[45] Date of Patent: Oct. 24, 2000

[54] SUPERCRITICAL REFRIGERATING SYSTEM

[75] Inventors: Shin Nishida; Yasutaka Kuroda, both of Anjo, Japan

[73] Assignee: Denso Corporation, Kariya, Japan

[21] Appl. No.: 09/234,188

[22] Filed: Jan. 20, 1999

[30] Foreign Application Priority Data

Jan. 21, 1998 [JP] Japan .................. 10-009777

[51] Int. Cl.[7] .................................... F25B 41/04
[52] U.S. Cl. .................. 62/216; 62/210; 62/222; 62/225
[58] Field of Search ............. 62/216, 205, 222, 62/225, 210, 511

[56] References Cited

U.S. PATENT DOCUMENTS

| | | | |
|---|---|---|---|
| 1,782,687 | 11/1930 | Hoffman . | |
| 2,148,412 | 2/1939 | Conrad | 62/8 |
| 2,245,454 | 6/1941 | Baker | 62/3 |
| 2,326,093 | 8/1943 | Carter | 62/8 |
| 2,331,264 | 10/1943 | Carter | 62/8 |
| 4,081,971 | 4/1978 | Eber | 62/216 |
| 4,267,702 | 5/1981 | Houk | 62/115 |
| 4,286,438 | 9/1981 | Clarke | 62/216 |
| 4,646,533 | 3/1987 | Morita et al. | 62/225 |
| 4,852,364 | 8/1989 | Seener | 62/225 |
| 5,205,131 | 4/1993 | Powlas | 62/203 |
| 5,245,836 | 9/1993 | Lorentzen et al. . | |
| 5,533,353 | 7/1996 | Baker et al. . | |
| 5,685,160 | 11/1997 | Abersfelder et al. . | |

FOREIGN PATENT DOCUMENTS

| | | |
|---|---|---|
| 0504 775 A2 | 9/1992 | European Pat. Off. . |
| 0786 632 A2 | 7/1997 | European Pat. Off. . |
| 0837 291 A2 | 4/1998 | European Pat. Off. . |
| 0892 226 A2 | 1/1999 | European Pat. Off. . |
| WO 93/06423 | 4/1993 | WIPO . |

*Primary Examiner*—William Doerrler
*Assistant Examiner*—Marc Norman
*Attorney, Agent, or Firm*—Harness, Dickey & Pierce, PLC

[57] ABSTRACT

When a compressor is stopped, a refrigerant passage in which refrigerant flows from a radiator to an evaporator is closed by a pressure control valve. Accordingly, even after the compressor is stopped, a high-pressure side pressure can be prevented from decreasing. This does not cause increased manufacturing cost of a supercritical refrigerating system.

17 Claims, 9 Drawing Sheets

SUPERCRITICAL REFRIGERATING SYSTEM

CROSS REFERENCE TO RELATED APPLICATION

This application is based upon and claims the benefit of priority of the prior Japanese Patent Application No. 10-9777, filed on Jan. 21, 1998, the contents of which are incorporated herein by reference.

BACKGROUND OF THE INVENTION

1. Field of the Invention

This invention relates to a supercritical refrigerating system suitable for a supercritical refrigerating cycle (hereinafter referred to as $CO_2$ cycle) using carbon dioxide ($CO_2$) as refrigerant, in which a pressure inside a radiator exceeds a supercritical pressure.

2. Description of the Related Art

As disclosed in WO 90/07683, to exhibit a specific refrigerating capacity in a $CO_2$ cycle, the $CO_2$ cycle needs to maintain a high-pressure side (radiator side) pressure equal to or more than a specific pressure.

In an automotive refrigerating cycle using fleon as refrigerant, the refrigerating capacity is controlled by operating and stopping a compressor via an electromagnetic clutch. In the $CO_2$ cycle, however, when the refrigerating capacity is controlled only by operating and stopping the compressor, the high-pressure side pressure, which needs to be kept at the specific pressure or more as described above, may decrease during the time when the compressor is stopped. In this case, it becomes difficult to exhibit a sufficient refrigerating capacity immediately after the compressor is restarted.

To solve this problem, it is conceivable that the refrigerating capacity is controlled by changing a discharge capacity of a variable capacity type compressor, without stopping the compressor. However, this method requires a complicated structure of the compressor and a control amplifier for controlling the compressor, resulting in increased manufacturing cost.

SUMMARY OF THE INVENTION

The present invention has been made in view of the above problem. An object of the present invention is, in a supercritical refrigerating system, to prevent a high-pressure side pressure from decreasing, without increasing manufacturing cost.

According to the present invention, briefly, when a compressor i s stopped, a refrigerant passage in which refrigerant flows from a radiator to an evaporator is closed. Accordingly, even after the compressor is stopped, a high-pressure side pressure can be prevented from decreasing. This does not cause increased manufacturing cost of a supercritical refrigerating system. In addition, sufficient refrigerating capacity can be provided immediately after the compressor is restarted.

The refrigerant passage can be closed by a pressure control valve. The pressure control valve includes: a casing defining therein the refrigerant passage and having a valve orifice through which an upstream side space of the refrigerant passage and a downstream side space of the refrigerant passage communicates with one another; a pressure responsive unit disposed in the upstream side space, defining a sealed space, and including a pressure responsive member which moves in response to a pressure difference between an inside pressure of the sealed space and an inside pressure of the refrigerant passage; and a valve member connected to the pressure responsive member for adjusting an opening degree of the valve orifice. The valve member is moved to decrease the opening degree of the valve orifice when the inside pressure of the sealed space is larger than the inside pressure of the refrigerant passage by a specific valve, and is moved to increase the opening degree of the valve orifice when the inside pressure of the sealed space is smaller than the inside pressure of the refrigerant passage by the specific value.

BRIEF DESCRIPTION OF THE DRAWINGS

Other objects and features of the present invention will become more readily apparent from a better understanding of the preferred embodiments described below with reference to the following drawings.

DETAILED DESCRIPTION OF THE PREFERRED EMBODIMENTS (First Embodiment)

Figure 1:
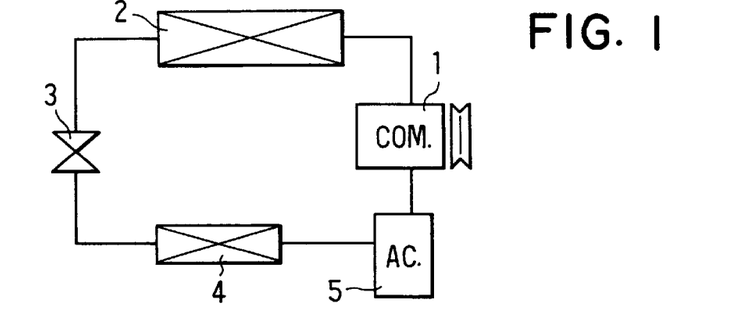
FIG. 1 is a schematic view showing a $CO_2$ cycle according to a first preferred embodiment.

As shown in FIG. 1, a $CO_2$ cycle in a first preferred embodiment is applied to an automotive air conditioning apparatus. In the air conditioning apparatus, a compressor 1 is driven by an engine (not shown) for driving a vehicle via clutch means such as an electromagnetic clutch to compress gas phase $CO_2$. A radiator (gas cooler) 2 cools $CO_2$ compressed by the compressor 1 by exchanging heat with outside air. A pressure control valve 3 controls a pressure at an outlet side of the radiator 2 in accordance with a temperature of $CO_2$ at the outlet side of the radiator 2. The pressure control valve 3 also functions as a decompressor. $CO_2$ is decompressed by the pressure control valve 3 to be low-temperature and low-pressure gas-liquid two phase $CO_2$.

An evaporator (heat sink) 4 functions as air cooling means for cooling air inside a passenger compartment of the vehicle. The gas-liquid two phase $CO_2$ is vaporized (evaporated) within the evaporator 4 while absorbing evaporation latent from air inside the passenger compartment, so that the air inside the passenger compartment is cooled. An accumulator (tank member) 5 separates the gas-liquid two phase $CO_2$ into gas phase $CO_2$ and liquid phase $CO_2$, and temporarily accumulates the liquid phase $CO_2$ therein. The compressor 1, the radiator 2, the pressure control valve 3, the evaporator 4, and the accumulator 5 are respectively connected to one another through pipes to constitute a closed circuit. The radiator 2 is disposed on a vehicle front side more than another radiator (not shown) so that a temperature difference between $CO_2$ inside the radiator 2 and outside air becomes as large as possible.

Next, a structure of the pressure control valve 3 will be described referring to FIG. 2. A casing 301 forms a part of a $CO_2$ passage 6a extending from the radiator 2 to the evaporator 4, and accommodates an element case 315 described later. An upper lid 301a has an inlet 301b connected to the radiator side. A casing main portion 301c has an outlet 301d connected to the evaporator side. The casing 301 has a partition wall 302 for partitioning the $CO_2$ passage 6a into an upstream side space 301e and a downstream side space 301f. The partition wall 302 has a valve orifice 303, through which the upstream side space 301e and the downstream side space 301f communicate with each other.

The valve orifice 303 is opened and closed by a valve member 304 having a shape of a needle. The valve member 304 works with a diaphragm (pressure responsive member) 306 described later to close the valve orifice 303 when the diaphragm 306 moves from a neutral position toward the valve member 304 (a lower end of the diaphragm 306 in a thickness direction). On the other hand, an opening degree of the valve orifice 303 (displacement amount of the valve member 304 from a position when the valve orifice 303 is fully closed) becomes the maximum when the diaphragm 306 moves toward an upper end of the diaphragm 306 in the thickness direction. Incidentally, when the diaphragm 306 is at the neutral position, the diaphragm 306 is not deformed and not displaced, so that stress produced by the deformed and displaced diaphragm 306 is substantially zero.

A sealed space (gas-filled room) 305 is formed inside the upstream side space 301e. The sealed space 305 is defined by the thin-film diaphragm 306, and a diaphragm upper-side supporting member (forming member) 307 disposed on the upper end side of the diaphragm 306 in the thickness direction. The diaphragm 306 is made of stainless steel and is deformed and displaced in response to a pressure difference between inside and outside pressures of the sealed space 305.

Figure 3:
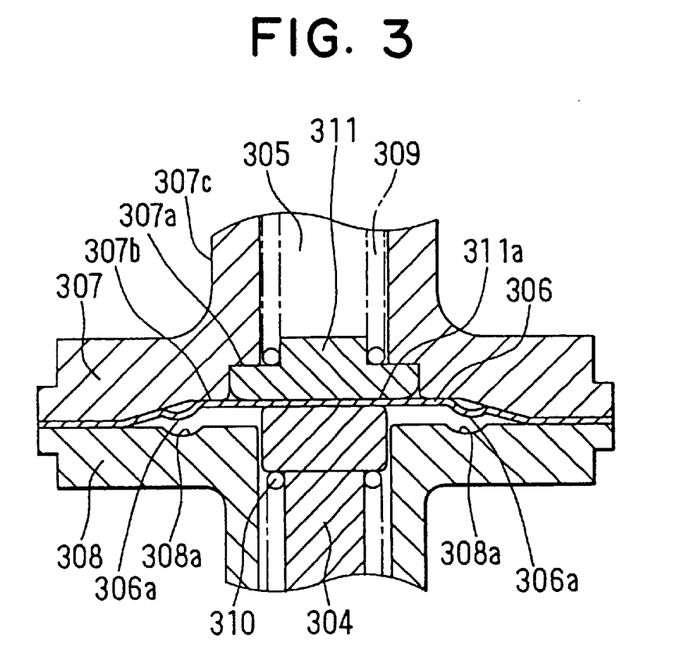
FIG. 3 is an enlarged cross-sectional view showing a diaphragm portion when the pressure control valve is opened.
Figure 4:
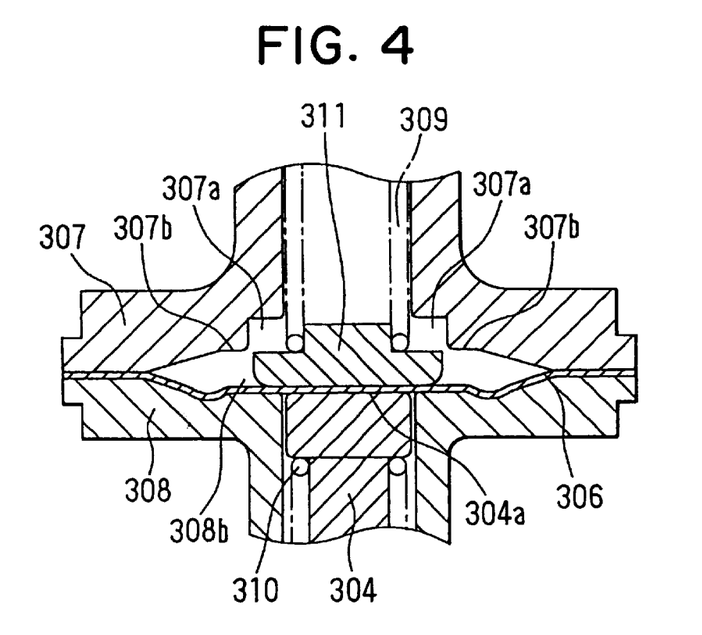
FIG. 4 is an enlarged cross-sectional view showing the diaphragm portion when the pressure control valve is closed.

Further, a diaphragm lower-side supporting member (holding member) 308 is disposed on the lower end side of the diaphragm 306 in the thickness direction to securely support the diaphragm 306 together with the upper-side supporting member 307. As shown in FIGS. 3 and 4, the lower-side supporting member 308 has a recess portion (holding member deformed portion) 308a at a position corresponding to a deformation facilitating portion (moving member deformed portion) 306a formed in the diaphragm 306. The recess portion 308a has a shape corresponding to the deformation facilitating portion 306a.

The deformation facilitating portion 306a is formed by deforming a part of the diaphragm 306 at an external side in a diameter direction into a wave shape so that the diaphragm 306 is displaced and deformed substantially in proportion to the pressure difference between the inside and outside pressures of the sealed space 305. Further, the lower-side supporting portion 308 has a lower-side flat portion (holding member flat portion) 308b. When the valve orifice 303 is closed by the valve member 304, the lower-side flat portion 308b is disposed substantially on the same surface as a contact surface 304a of the valve member 304 for making contact with the diaphragm 306.

Figure 2:
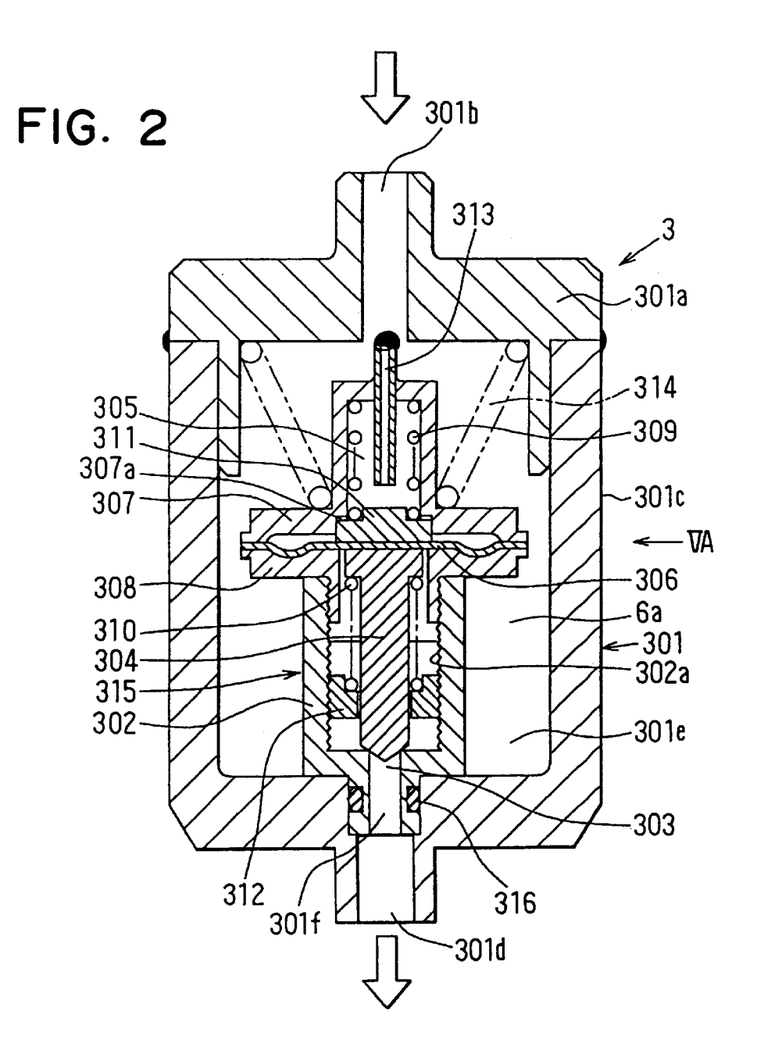
FIG. 2 is a cross-sectional view showing a pressure control valve in the first embodiment.

Further, as shown in FIG. 2, a first coil spring (first elastic member) 309 is disposed on the upper end side of the diaphragm 306 in the thickness direction (inside the sealed space 305). The first coil spring 309 applies elastic force to the valve member 304 through the diaphragm 306 so that the valve orifice 303 is closed. On the lower end side of the diaphragm 306 in the thickness direction, a second coil spring (second elastic member) 310 is disposed to apply elastic force to the valve member 304 so that the valve orifice 303 is opened.

A plate (rigid body) 311 made of metal and having a specific thickness so that the plate 311 has rigidity larger than that of the diaphragm 306 is disposed between the diaphragm 306 and the first coil spring 309. The plate 311 functions as a spring seat for the first coil spring 309. As shown in FIGS. 3 and 4, the plate 311 makes contact with a step portion (stopper portion) 307a of the upper-side supporting member 307, thereby restricting the diaphragm 306 from being displaced more than a specific amount toward the upper end side of the diaphragm 306 in the thickness direction (toward the sealed space 305).

The upper-side supporting member 307 has an upper-side flat portion (forming member flat portion) 307b. When the plate 311 makes contact with the step portion 307a, the upper-side flat portion 307b is disposed substantially on the same surface as a contact surface 311a of the plate 311 for making contact with the diaphragm 306. An inner wall of a cylindrical portion 307c of the upper-side supporting member 307 functions as a guiding wall for guiding the first coil spring 309. The plate 311 and the valve member 304 are pressed against the diaphragm 306 by the first and second coil springs 309, 310, respectively; therefore, the plate 311, the valve member 304, and the diaphragm 306 integrally move (operate) while making contact with one another.

Referring again to FIG. 2, an adjustment screw (elastic force adjustment mechanism) 312 adjusts the elastic force applied to the valve member 304 by the second coil spring 310 and simultaneously functions as a plate for the second coil spring 310. The adjustment screw 312 is fastened to a female screw 302a formed on the partition wall 302. An initial load (elastic force when the valve orifice 303 is closed) by the first and second coil springs 309, 310 is approximately 1 MPa when it is converted to the pressure applied to the diaphragm 306.

A sealing tube (piercing member) 313 is disposed to pierce the upper-side supporting member 307. $CO_2$ is sealed into the sealed space 305 through the sealing tube 313. The sealing tube 313 is made of a material having heat conductivity larger than that of the upper-side supporting member 307 made of stainless steel, such as copper. Incidentally, the lower-side supporting member 308 is also made of stainless steel. After $CO_2$ is sealed into the sealed space 305 with a density of approximately 600 kg/m³ in the state where the valve orifice 303 is closed, an end of the sealing tube 313 is blocked by welding or the like.

Figure 5A:
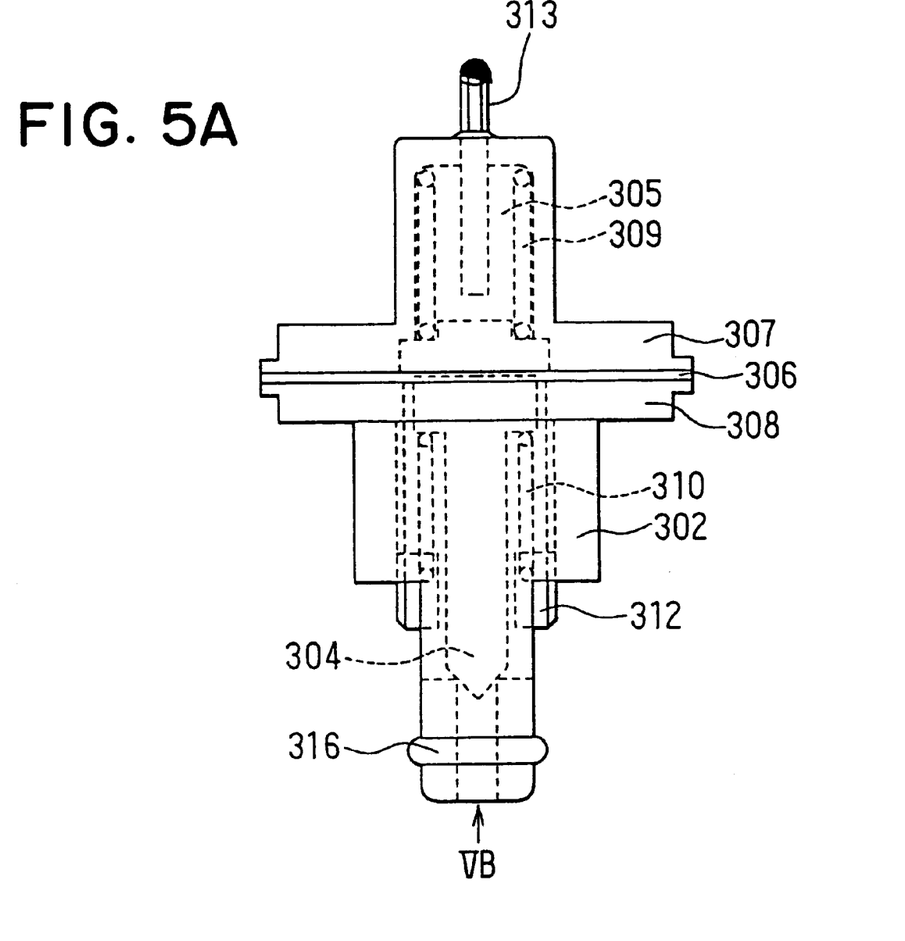
FIG. 5A is a front view taken in a direction indicated by an arrow VA in FIG. 2 and showing an element case of the pressure control valve.
Figure 5B:
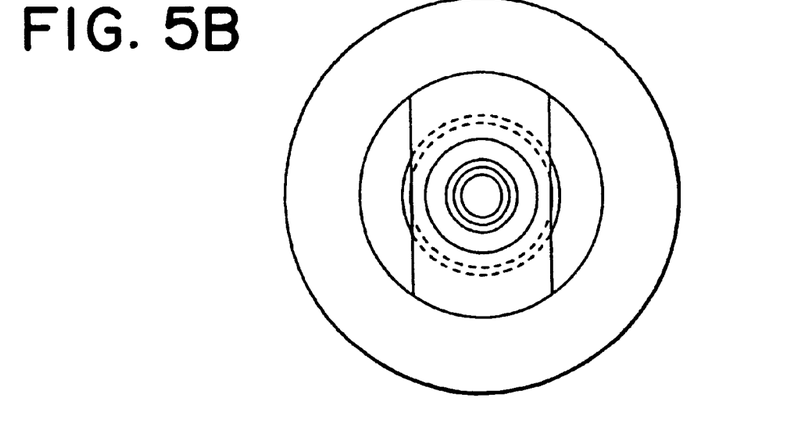
FIG. 5B is a bottom view taken in a direction indicated by an arrow VB in FIG. 5A, showing the element case.

The element case 315 composed of the parts 302–313 is secured inside the casing main portion 301c by a conical spring 314. An O-ring 316 seals a clearance between the element case 315 (partition wall 302) and the casing main portion 301c. FIG. 5A is a schematic view taken from an arrow VA in FIG. 2, showing the element case 315, and FIG. 5B is a top view taken from an arrow VB in FIG. 5A. The valve orifice 303 communicates with the upstream side space 301e at a side face side of the partition wall 302.

Next, operation of the pressure control valve 3 according to the first embodiment will be described.

Figure 6:
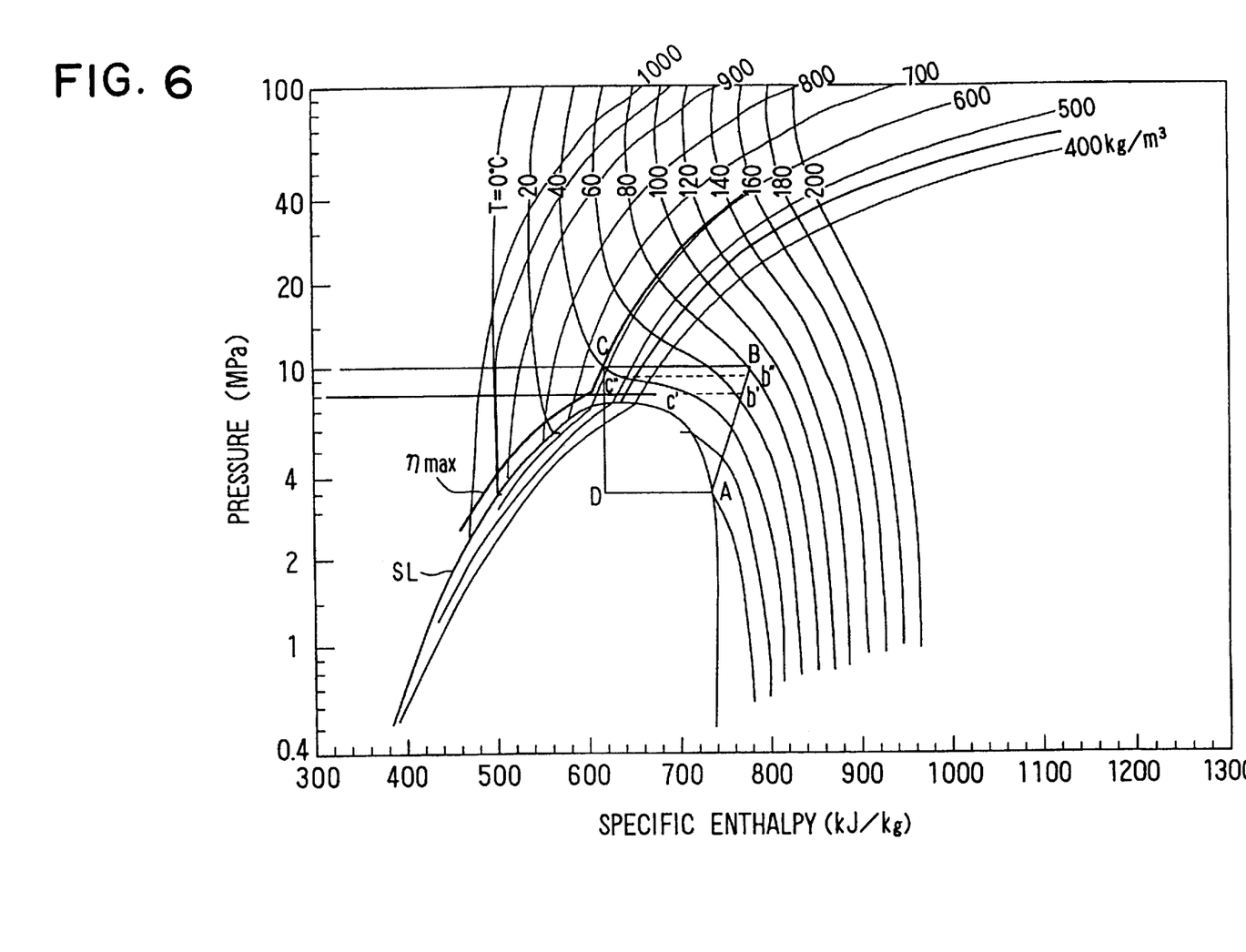
FIG. 6 is a Mollier diagram of $CO_2$.

1. When the compressor 1 is operated:

The sealed space 305 is filled with $CO_2$ with a density of approximately 600 kg/m³; therefore, a pressure and a temperature inside the sealed space 305 change along an isopycnic line of 600 kg/m³ shown in FIG. 6. For example, when the temperature inside the sealed space 305 is 20° C., the pressure inside the sealed space 305 is approximately 5.8 MPa. Since both of the inside pressure of the sealed space 305 and the initial load of the first and second coil springs 309, 310 are applied to the valve member 304 simultaneously, an operation pressure applied to the valve member 304 is approximately 6.8 MPa. Therefore, when the pressure inside the upstream side space 301e on the radiator side is 6.8 MPa or lower, the valve orifice 303 is closed by the valve member 304. When the pressure inside the upstream side space 301e exceeds 6.8 MPa, the valve orifice 303 is opened.

Likewise, when the temperature inside the sealed space 305 is 40° C. for example, it is known from FIG. 6 that the pressure inside the sealed space 305 is approximately 9.7 MPa, and the operation force applied to the valve member 304 is approximately 10.7 MPa. Therefore, when the pressure inside the upstream side space 301e is 10.7 MPa or lower, the valve orifice 303 is closed by the valve member 304. When the pressure inside the upstream side space 301e exceeds 10.7 MPa, the valve orifice 303 is opened.

2. When the compressor 1 is stopped:

When compressor 1 is stopped by interrupting the driving force from being transmitted by the electromagnetic clutch, the pressure on the high-pressure side (on the radiator side) is decreased and $CO_2$ on the high-pressure side is cooled. Accordingly, the pressure outside the sealed space 305 (within the $CO_2$ passage 6a) is decreased to be lower than the pressure inside the sealed space 305. As a result, the diaphragm 306 is displaced toward the lower-side supporting member side so that the valve orifice 303 is closed.

Next, operation of the $CO_2$ cycle will be described with reference to FIG. 6. For example, when the temperature on the outlet side of the radiator 2 is 40° C. and the pressure on the outlet side of the radiator 2 is 10.7 MPa or less, the pressure control valve 3 is closed as described above. Therefore, the compressor 1 sucks $CO_2$ stored in the accumulator 5 and discharges $CO_2$ toward the radiator 2, thereby increasing the pressure on the outlet side of the radiator 2 (b'-c'→b"-c").

Then, when the pressure on the outlet side of the radiator 2 exceeds 10.7 MPa (B-C), the pressure control valve 3 opens. As a result, $CO_2$ is decompressed to perform phase transition from a gas phase to a gas-liquid two-phase (C-D), and flows into the evaporator 4. The gas-liquid two-phase $CO_2$ is evaporated inside the evaporator 4 (D-A) to cool air, and returns to the accumulator 5. Meanwhile, the pressure on the outlet side of the radiator 2 decreases again, so that the pressure control valve 3 is closed again. Thus, in the $CO_2$ cycle, after the pressure on the outlet side of the radiator 2 is increased to a specific pressure by closing the pressure control valve 3, $CO_2$ is decompressed and evaporated so that air is cooled. Incidentally, when the temperature on the outlet side of the radiator 2 is 20° C., similarly to the operation described above, the pressure control valve 3 is opened when the pressure on the outlet side of the radiator 2 exceeds approximately 6.8 MPa.

Next, effects in the first embodiment will be described. According to the first embodiment, as described above, as soon as the compressor 1 is stopped (the electromagnetic clutch is turned off), the valve orifice 303 (the $CO_2$ passage 6a) is closed. Therefore, even after the compressor 1 is stopped, the pressure on the high-pressure side can be prevented from decreasing. This does not cause increase in the manufacturing cost of the $CO_2$ cycle. Further, immediately after the compressor 1 is restarted, sufficient refrigerating capacity can be provided.

Figure 7A:
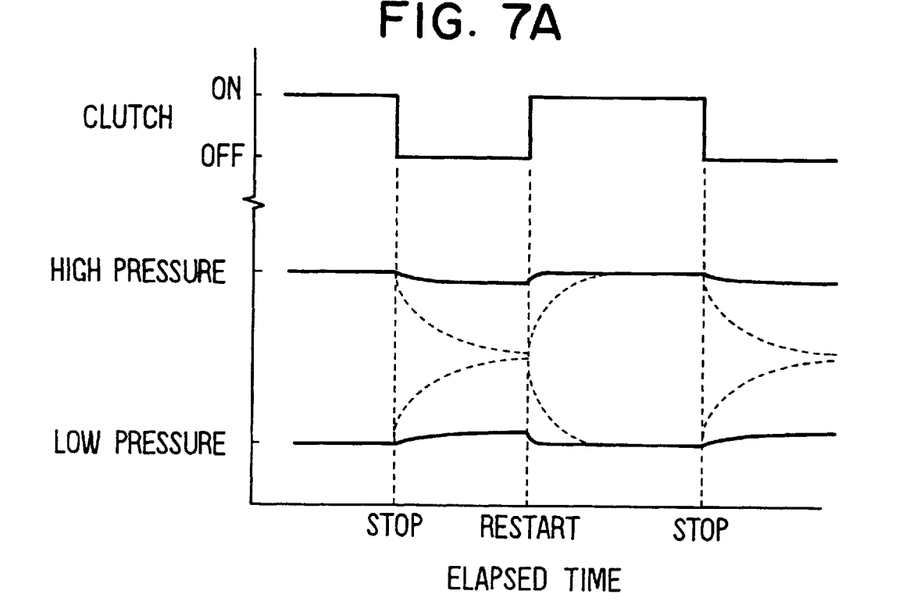
FIG. 7A is a chart showing relations between high-pressure side and low pressure side pressures and ON-OFF timing of an electromagnetic clutch in the $CO_2$ cycle in the first embodiment.
Figure 7B:
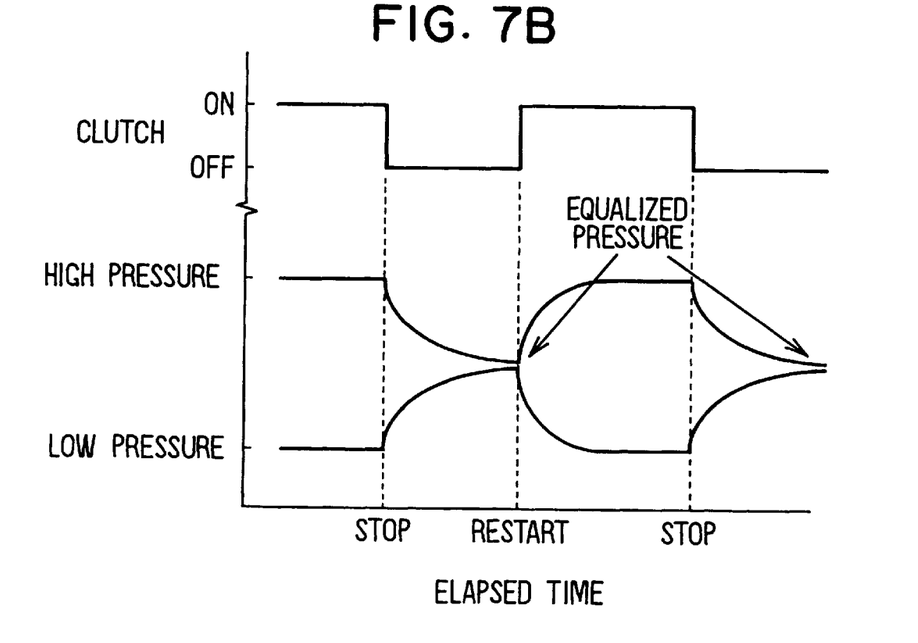
FIG. 7B is a chart showing relations between high-pressure side and low-pressure side pressures and ON-OFF timing of an electromagnetic clutch in a $CO_2$ cycle according to a prior art.

FIGS. 7A and 7B are charts showing relations between ON-OFF timing of the electromagnetic clutch and the pressures on the high-pressure side (radiator side) and on the low-pressure side (evaporator side). FIG. 7A shows the relation in the $CO_2$ cycle in the first embodiment, while FIG. 7B shows the relation in a conventional $CO_2$ cycle. As understood from the figures, it is confirmed that, in the $CO_2$ cycle according to this embodiment, the pressure on the high-pressure side can be prevented from decreasing after the electromagnetic clutch is turned off.

Figure 8:
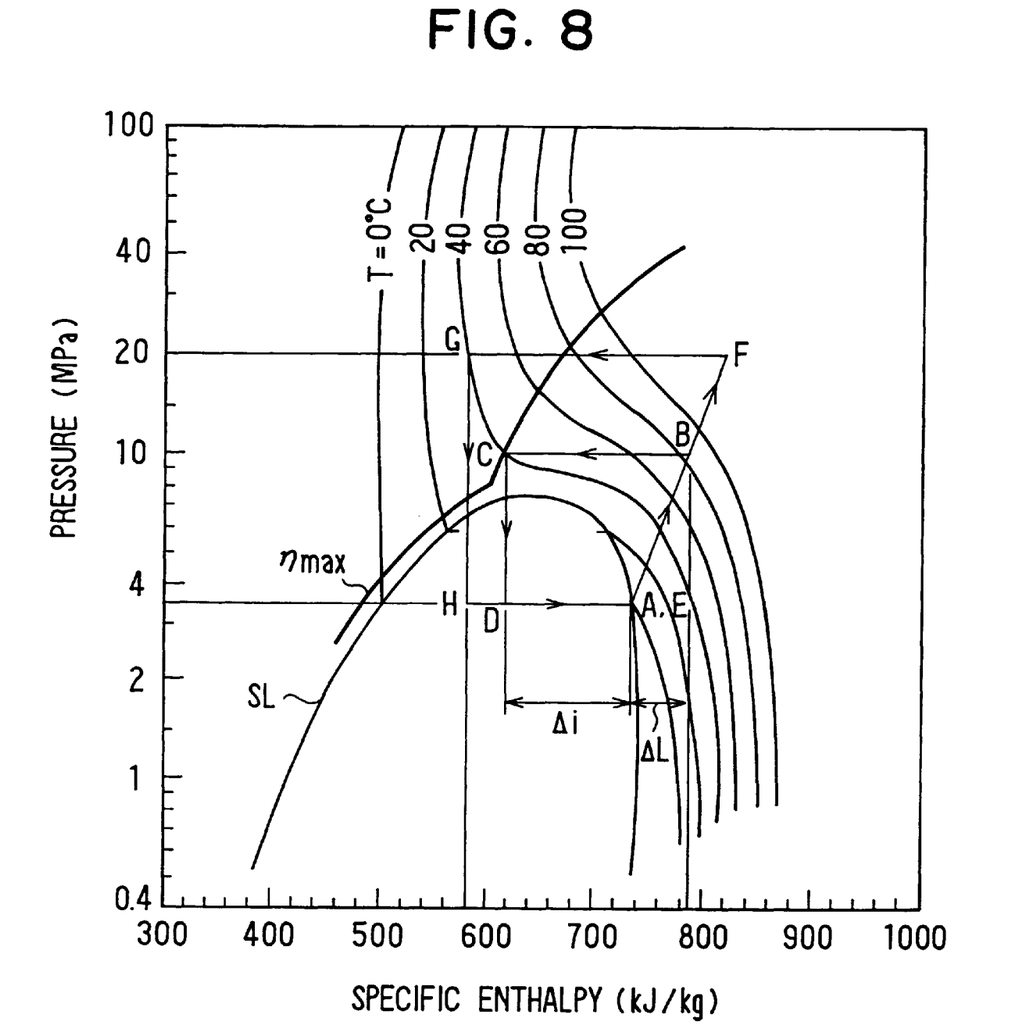
FIG. 8 is a Mollier diagram of $CO_2$.

On the other hand, to increase the pressure on the outlet side of the radiator 2, the discharge pressure of the compressor 1 has to be increased, so that compression work (amount of enthalpy change $\Delta L$ during the compression) increases (see FIG. 8). However, when an increased amount of enthalpy change $\Delta L$ during the compression (A-B) is larger than an increased amount of enthalpy change $\Delta i$ during the evaporation (D-A), a performance coefficient (COP=$\Delta i/\Delta L$) of the $CO_2$ cycle deteriorates.

Figure 9:
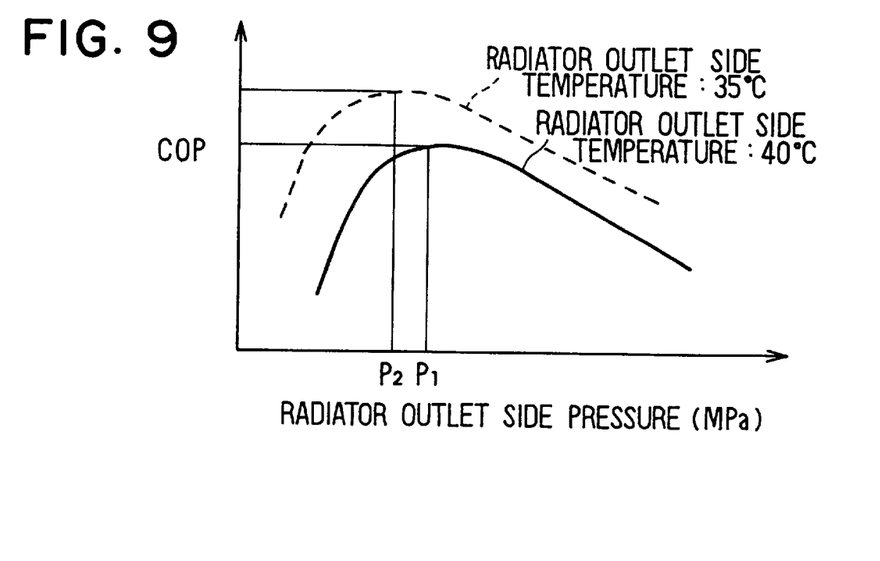
FIG. 9 is a graph showing a relation between a performance coefficient (COP) and a radiator outlet side pressure in the first embodiment.

For example, assuming that the radiator outlet side temperature of $CO_2$ is 40° C., a relation between the radiator outlet side pressure of $CO_2$ and the performance coefficient is calculated. In this case, as indicated by a solid line in FIG. 9, the performance coefficient becomes the maximum at pressure P1 (approximately 10 MPa). Likewise, assuming that the radiator outlet side temperature of $CO_2$ is 35° C., the performance coefficient becomes the maximum at pressure P2 (approximately 9.0 MPa) as indicated by a broken line in FIG. 9.

Thus, pressures at which the performance coefficient becomes the maximum are calculated with respect to various temperatures of $CO_2$ on the radiator outlet side. The result is indicated by bold solid line (optimum control line) $\theta_{max}$ on the Mollier charts in FIG. 6 or 8. As understood from FIG. 6, because the optimum control line $\theta_{max}$ approximately corresponds to the isopycnic line of 600 kg/cm³, it is confirmed that the $CO_2$ cycle in this embodiment is controlled so that the performance coefficient becomes the maximum along the optimum control line $\theta_{max}$.

The deviation of the optimum control line $\theta_{max}$ from the isopycnic line of 600 kg/cm³ becomes large when the pressure is lower than the critical pressure; however, because this range is a condensation range, the pressure inside the sealed space 305 varies along saturated liquid line SL. Further, because the initial load is applied to the valve element 304 by the coil springs 309, 310, the supercooling degree (sub-cooling) is controlled to be approximately 10° C. Therefore, even when the pressure is lower than the critical pressure, the $CO_2$ cycle can be effectively operated.

Figure 10:
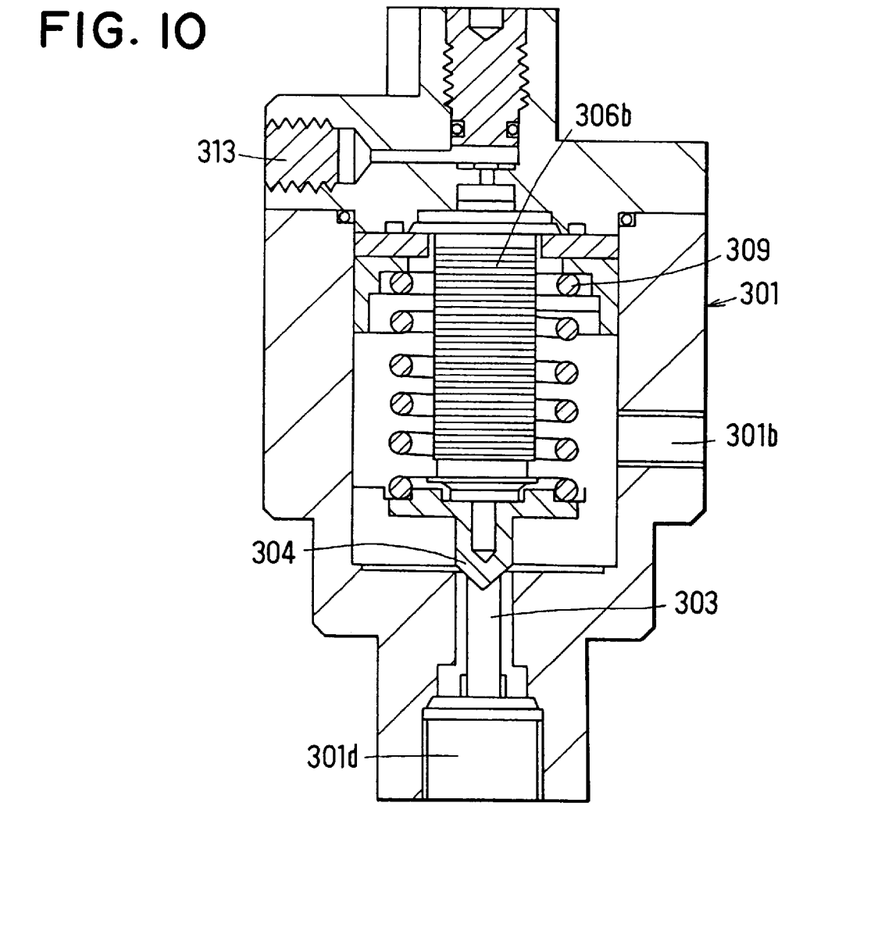
FIG. 10 is a cross-sectional view showing a pressure control valve as a modified example of the first embodiment.

In the sealed space 305, it is desirable for a practical use that $CO_2$ is sealed with a saturated liquid density at a temperature in a range of 0° C. to a critical point of $CO_2$. Specifically, the desirable density of $CO_2$ is in a range of 450 kg/cm³ to 950 kg/cm³. In this embodiment, the thin film diaphragm 306 is used as a pressure responsive member which moves in response to a pressure difference between inside and outside the sealed space 305; however, as shown FIG. 10, the pressure responsive member may be composed of a bellows 306b. In this example, the bellows 306b is disposed in the sealed space 305.

(Second Embodiment)

The pressure control valve 3 used in the first embodiment is a mechanical type; however, a pressure control valve 7 used in a second preferred embodiment is an electric type.

Figure 11:
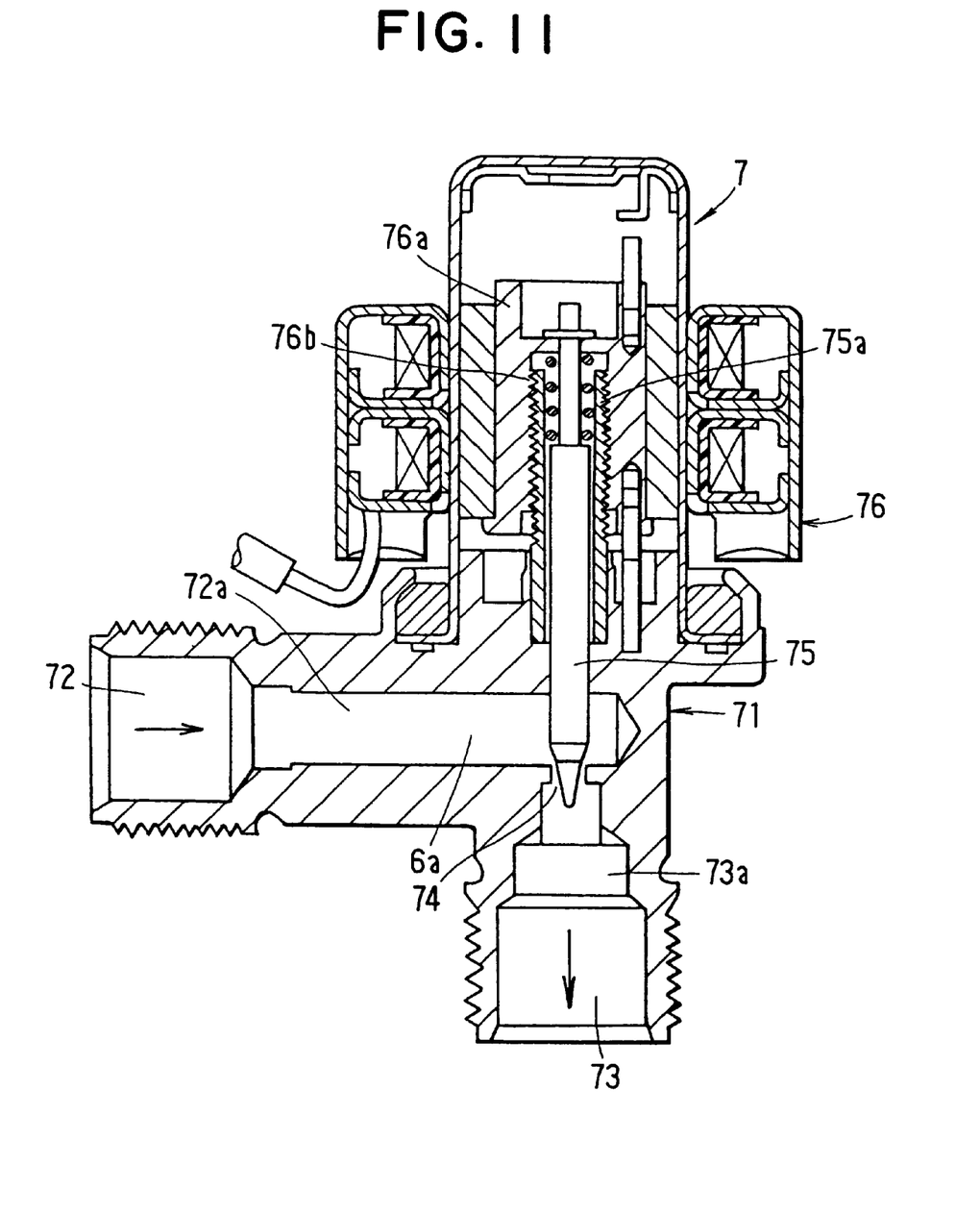
FIG. 11 is a cross-sectional view showing a pressure control valve in a second preferred embodiment.

Referring to FIG. 11, the pressure control valve 7 includes a housing 71 having an inlet 72 communicating with the outlet side of the radiator 2 and an outlet 73 communicating with the inlet side of the evaporator 4. A valve orifice 74 is provided in the housing 71 so that an inlet side space 72a and an outlet side space 73a communicate with each other through the valve orifice 74. A needle-like valve member 75 is further provided in the housing 71 to adjust an opening degree of the valve orifice 74. The valve member 75 is controlled by a step motor 76. The step motor 76 has a female screw portion 76b on a magnetic rotor 76a thereof, and the valve member 75 has a male screw portion 75a which is to be fastened to the female screw portion 76b.

Figure 12:
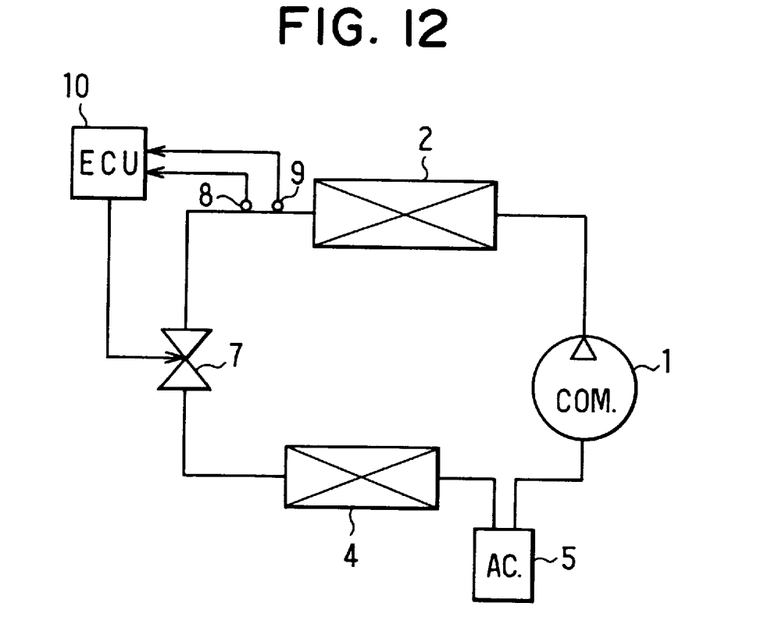
FIG. 12 is a schematic view showing a $CO_2$ cycle in the second embodiment.

Further, as shown in FIG. 12, the opening degree of the valve orifice 74 (the opening degree of the pressure control valve 7) is continuously controlled from a fully closed state to a fully opened state, by a temperature sensor (temperature detecting member) 8 for detecting a radiator outlet side temperature of $CO_2$, a pressure sensor (pressure detecting member) 9 for detecting a radiator outlet side pressure of $CO_2$, and an electronic control unit (ECU) for rotating the step motor 76 based on ON-OFF signals of the electromagnetic clutch so that the step motor 76 moves the valve member 75 in an axial direction of the valve member 75.

In the above-mentioned embodiments, the pressure control valves 3, 7 close the $CO_2$ passage 6a between the radiator 2 and the evaporator 4 when the compressor 1 is stopped; however, valve means such as an electromagnetic valve other than the pressure control valves 3, 7 may be disposed in the $CO_2$ passage to close the $CO_2$ passage when the compressor 1 is stopped.

Figure 13:
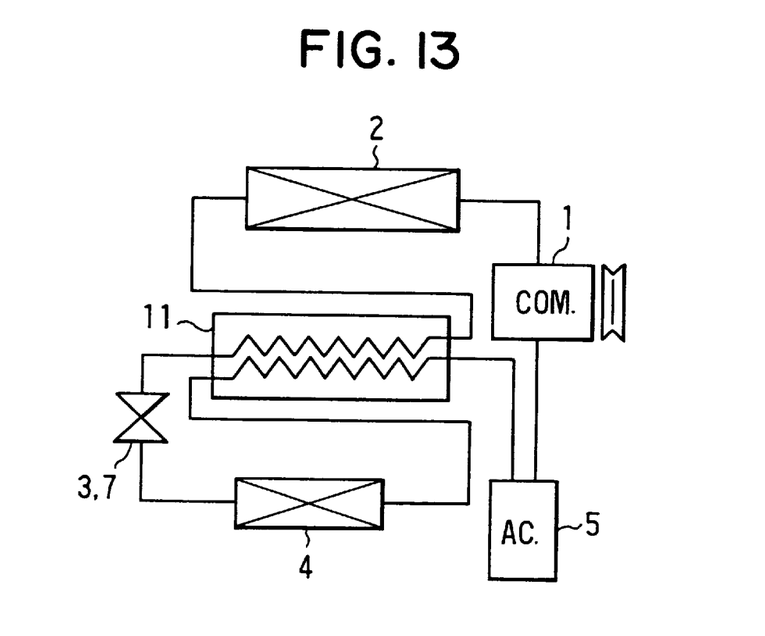
FIG. 13 is a schematic view showing a $CO_2$ cycle in a modified embodiment according to the present invention.

As shown in FIG. 13, when an intermediate heat exchanger 11 is provided to exchange heat between $CO_2$ flowing between the radiator 2 and the pressure control valve 3 or 7 and $CO_2$ flowing between the evaporator 4 and the compressor 1, likewise the supercritical refrigerating cycle ($CO_2$ cycle) according to the present invention can be provided. In this example, because the enthalpy on the inlet side of the evaporator 4 can be decreased, an enthalpy difference between the inlet and the outlet of the evaporator 4 can be increased so that the refrigerating capacity increases.

The supercritical refrigerating cycle ($CO_2$ cycle) according to the present invention is not limited to the automotive refrigeration cycle described above, and can be applied to a refrigerating cycle for an electric vehicle which dispenses with an electromagnetic clutch and includes an electric motor for driving an operational state of a compressor, stationary refrigerating cycles, and the like.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A supercritical refrigerating system comprising:
   a compressor for compressing refrigerant;
   a radiator for cooling the refrigerant discharged from the compressor, in which an inside pressure exceeds a critical pressure of the refrigerant;
   a pressure control valve for decompressing the refrigerant discharged from the radiator, the pressure valve including:
   a casing having a partition wall partitioning an inside of the casing into an upstream side space and a downstream side space, an inlet communicating with the upstream side space for receiving the refrigerant discharged from the radiator, and an outlet communicating with the downstream side space for discharging the refrigerant from the casing, the partition wall having a valve orifice through which the upstream side space and the downstream side space communicates with one another;
   a pressure responsive unit disposed in the upstream side space, defining a sealed space in which the refrigerant is sealed with a specific density, and including a pressure responsive member which moves in response to a pressure difference between an inside pressure of the sealed space and an inside pressure of the upstream side space; and
   a valve member connected to the pressure responsive member for adjusting an opening degree of the valve orifice in cooperation with the pressure responsive member; and
   an evaporator for evaporating the refrigerant decompressed by the pressure control valve,
   wherein a refrigerant passage in which the refrigerant flows from the radiator to the evaporator is closed by the pressure control valve when the compressor is stopped; and
   wherein, in the pressure control valve, the inlet and the outlet of the casing are disposed approximately in a line and the pressure responsive unit is disposed between the inlet and the outlet in the line so that the sealed space faces the inlet.

2. The supercritical refrigerating system of claim 1, wherein the compressor is driven via a clutch member which intermits a driving force for driving the compressor.

3. The supercritical refrigerating system of claim 1, wherein:
   the pressure responsive member is a diaphragm having a deformation facilitating portion; and
   the pressure responsive unit has a supporting member for supporting the diaphragm at a side opposite the sealed space, the supporting member having a recess portion at a position corresponding to the deformation facilitating portion.

4. The supercritical refrigerating system of claim 3, wherein the recess portion has a shape corresponding to a shape of the deformation facilitating portion.

5. The supercritical refrigerating system of claim 1, wherein the sealed space has an axis extending approximately parallel to a direction in which the refrigerant enters into the casing through the inlet.

6. The supercritical refrigerating system of claim 1, wherein:
   the pressure responsive unit has a wall portion defining the sealed space; and the wall portion faces an inlet directly to interrupt a flow of the refrigerant from the inlet.

7. The supercritical refrigerating system of claim 6, wherein the wall portion has a cylindrical wall and a top wall facing the inlet directly.

8. The supercritical refrigerating system of claim 6, wherein the pressure responsive unit has a sealing tube piercing the wall portion for filling the sealed space with the refrigerant, the sealing tube facing the inlet and made of a material having a head conductivity larger than a heat conductivity of the wall portion.

9. The supercritical refrigerating system of claim 1, wherein the outlet and the valve orifice are disposed in the line approximately parallel to a direction in which the refrigerant flows out of the casing, whereby the refrigerant is discharged from the casing through the valve orifice and the outlet straightly.

10. A pressure control valve for decompressing refrigerant, comprising:

a casing defining therein a refrigerant passage in which the refrigerant flows and having an inlet for receiving the refrigerant therein, and an outlet for discharging the refrigerant therefrom;

a partition member disposed in the casing to divide an inside space of the casing into an upstream side space communicating with the inlet and a downstream side space communicating with the outlet, the partition member having a valve orifice through which the upstream side space and the downstream side space communicates with one another, a pressure responsive unit disposed in the upstream side space, having a wall portion defining a sealed space in which the refrigerant is sealed with a specific density, and including a pressure responsive member which moves in response to a pressure difference between an inside pressure of the sealed space and an inside pressure of the refrigerant passage; and a valve member connected to the pressure responsive member for adjusting an opening degree of the valve orifice, wherein the inlet and the outlet are disposed approximately in a line so that a direction in which the refrigerant enters the casing through the inlet is approximately parallel to a direction in which the refrigerant flows out of the outlet; and wherein the wall portion defining the sealed space is disposed between the inlet and the outlet to face the inlet.

11. Pressure control valve of claim 10, wherein:

the pressure responsive member is a diaphragm having a deformation facilitating portion; and the pressure responsive unit has a supporting member for supporting the diaphragm at a side opposite the sealed space, the supporting member having a recess portion at a position corresponding to the deformation facilitating portion.

12. The pressure control valve of claim 11, wherein the recess portion has a shape corresponding to a shape of the deformation facilitating portion.

13. The pressure control valve of claim 10, wherein the sealed space has an axis extending approximately parallel to the direction in which the refrigerant enters the casing through the inlet.

14. The pressure control valve of claim 10, wherein the wall portion defining the sealed space faces the inlet directly to interrupt a flow of the refrigerant from the inlet.

15. The pressure control valve of claim 14, wherein the wall portion has a cylindrical wall and a top wall facing the inlet directly.

16. The pressure control valve of claim 14, wherein the pressure responsive unit has a sealing tube piercing the wall portion for filling the sealed space with the refrigerant, the sealing tube facing the inlet and made of a material having a heat conductivity larger than a heat conductivity of the wall portion.

17. The pressure control valve of claim 10, wherein the outlet and the valve orifice are disposed approximately in the line parallel to the direction in which the refrigerant flows out of the outlet, whereby the refrigerant flows out of the casing through the valve orifice and the outlet straightly.

* * * * *